UNITED STATES PATENT OFFICE.

JAMES M. MERRITT, OF LOS ANGELES, CALIFORNIA.

GOPHER-TRAP.

SPECIFICATION forming part of Letters Patent No. 718,853, dated January 20, 1903.

Application filed September 25, 1902. Serial No. 124,843. (No model.)

*To all whom it may concern:*

Be it known that I, JAMES M. MERRITT, a citizen of the United States, residing at Los Angeles, in the county of Los Angeles and State of California, have invented new and useful Improvements in Gopher-Traps, of which the following is a specification.

Figure 1:
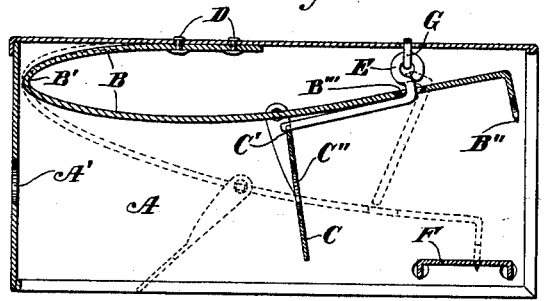
Figure 2:
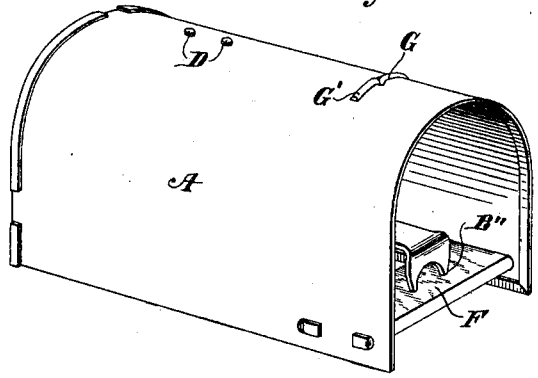
Figure 3:
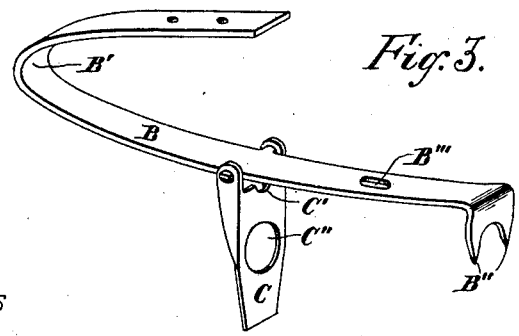

In Figure 1 I have shown a central vertical section, the trap being shown set in full lines and the same being shown sprung in the dotted lines. In Fig. 2 I have shown a perspective view of my trap looking into the open end, the pointed ends of the spring being down, showing that the trap has been sprung and in a position reverse of that shown in full lines in Fig. 1. Fig. 3 represents in perspective the mainspring, with its connected trigger.

In the drawings, A represents the casing of the trap, preferably made of galvanized iron, and B the mainspring, rigidly secured to the top of the casing, on the inside thereof, by rivets D. This spring is curved at B' and has pivotally secured to the lower part thereof the trigger C. This trigger is provided with an indentation C' to receive and engage the free end of the spring-catch E, which when placed in the position shown in Fig. 1 will hold the spring in the set position. The trigger has a circular light-opening C'', which will be in alinement with the light-opening A' in the back end of the casing when the trap is set, as shown in Fig. 1. The openings A' will permit light to enter the trap from the outside, which the gopher will see through the trigger. Light penetrating the gopher-hole will induce the gopher to enter the trap (the open end being down in the hole) to shut out the light and close the hole. In doing so the trigger is pushed backwardly. This will remove the trigger from the spring-catch, when the trap will be instantly sprung and the mainspring will drop approximately into the position shown in dotted lines in Fig. 1 and impale the gopher between the cross-piece F and the downwardly-projecting teeth B'' on the spring. An opening B''' is provided in the mainspring, through which the spring-catch is passed in setting the trap. The free end of the spring-catch is long enough to pass beyond the indentation C' in the trigger when the trigger is drawn to the front in setting the trap; but when the trigger is pushed back it will release the end of the spring-catch and spring the trap. The spring-catch is secured to the top of the casing by flexible wire G, bent upon itself to form a loop to engage the loop of the spring-catch, the ends G' of which are passed through an opening in the top of the casing made therefor and are then bent down into the position shown in Fig. 2. By this construction the spring-catch cannot turn around in the trap after being secured to the top, but is held in and is easily placed in position and is easily removed therefrom when desired.

Having described my invention, what I claim as new, and desire to secure by Letters Patent, is—

1. In a gopher-trap, the combination of a casing closed in the sides, the top, and at the back end, open at the bottom and at the front end; a cross-piece at the bottom of the casing adapted to engage the toothed end of the mainspring when the trap is sprung; a light-opening being provided in the back end of the casing; a mainspring bent partly upon itself and secured to the top of the casing, the said spring having sharp teeth projecting downward from the free end thereof, the spring having an opening to premit the passage therethrough of the spring-catch; a trigger pivotally secured to said spring and provided with a light-opening adapted to register when the trap is set with the light-opening in the back of the casing, the trigger being provided with an indentation therein to engage the free end of the spring-catch when the trap is set; a spring-catch movably secured to the top of the casing and adapted to be passed through the opening in the spring and to enter the indentation and engage the trigger when the trigger is thrown forward, and to be released from the trigger when the trigger is thrown back.

2. The herein-described gopher-trap comprising the casing A closed on its sides, top, and back, a light-opening A' in the back of the casing, a cross-piece F extending across the open bottom and adapted to engage the teeth on the free end of the mainspring when the trap is sprung; a mainspring B rigidly secured at one end to the top of the casing, the spring extending rearwardly from the point where secured to a point adjacent to the back of the casing and at this point bent nearly upon itself, the free end thereof terminating in the front in two downwardly-projecting teeth B'', and having an opening B''' therethrough for the reception of the spring-catch G; a trigger C pivoted to said spring and having an indentation C' in the upper end thereof to engage the free end of the spring-catch G, the said trigger being provided in its center with a light-opening C'' adapted when the trap is set to register with the light-opening in the casing; a spring-catch G movably secured to the top of the casing and adapted to pass through the opening B''' in the spring and engage the trigger and hold the spring in its set position while the trigger is in its forward position and release the spring when moved to its rear position.

In witness that I claim the foregoing I have hereunto subscribed my name this 18th day of September, 1902.

JAMES M. MERRITT.

Witnesses:
HENRY T. HAZARD,
M. C. NICKELESON.